United States Patent Office 3,721,482
Patented Mar. 20, 1973

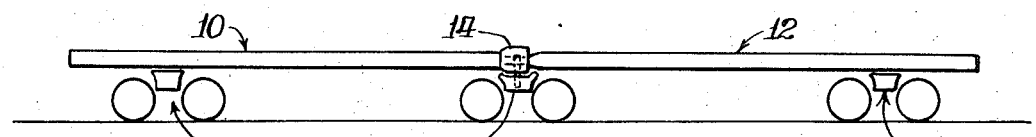
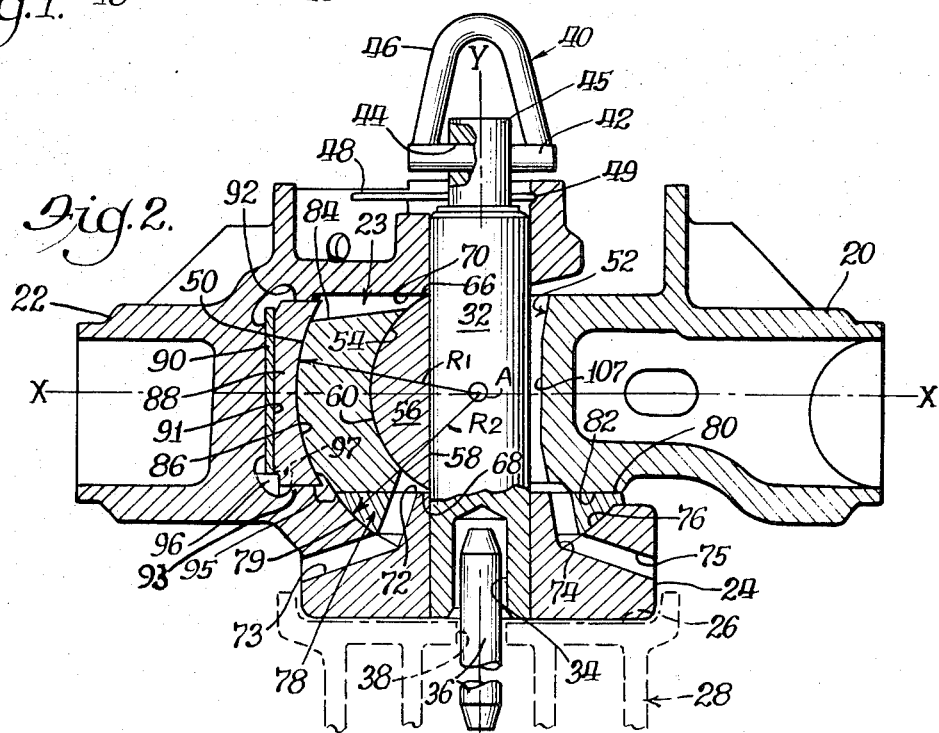
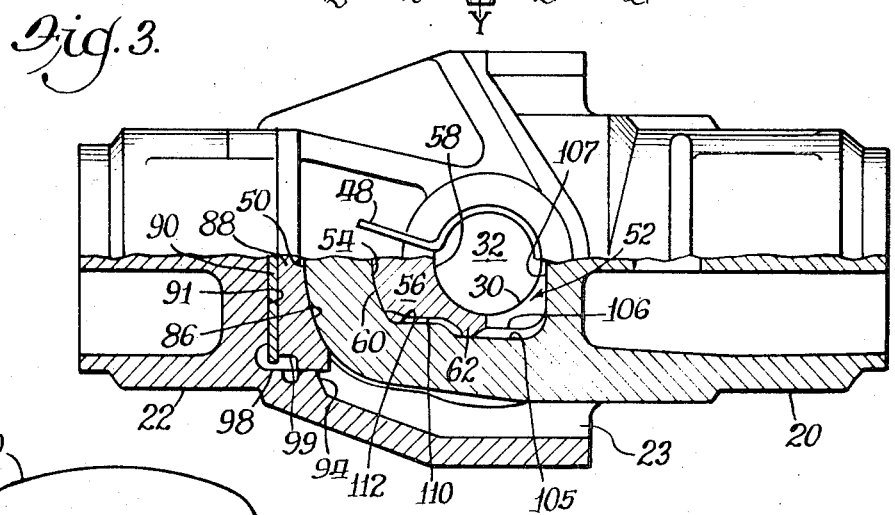
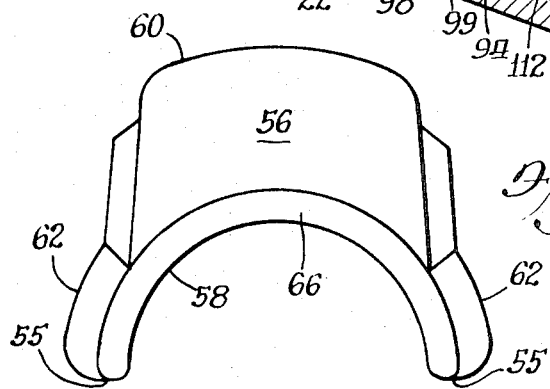

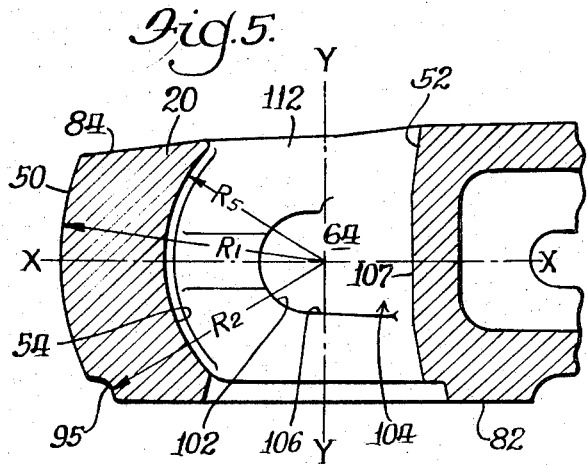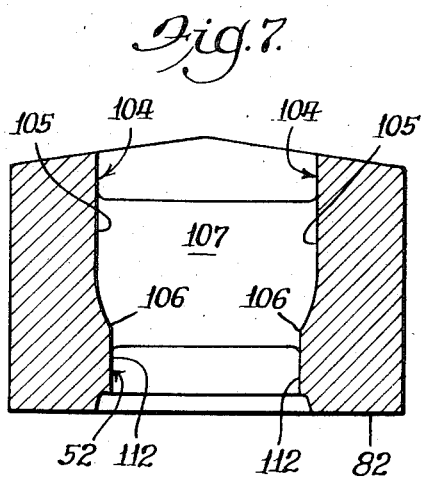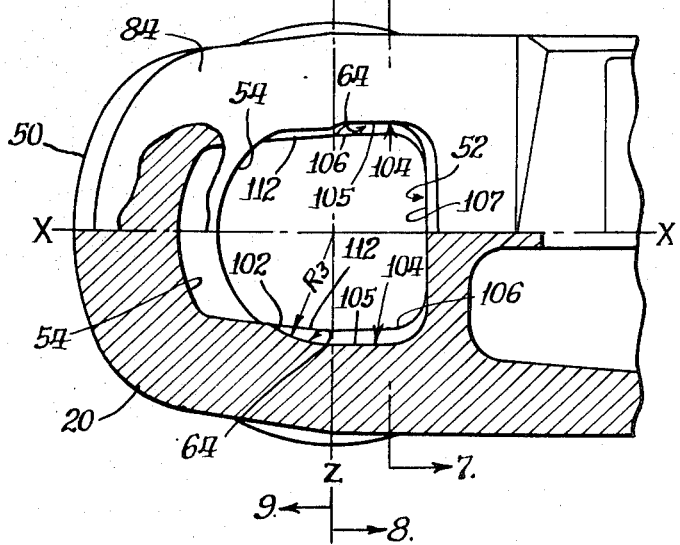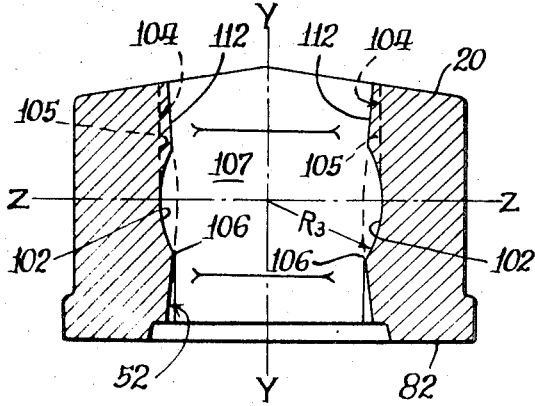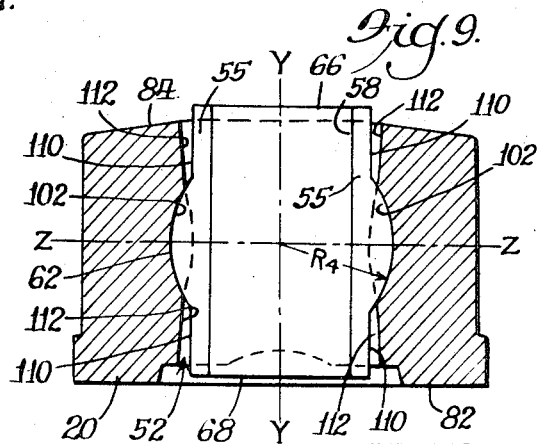

3,721,482
MOUNTING FOR PIN BEARING BLOCK
Carl E. Tack, Elmhurst, and Loyal J. Rodgers, Kenilworth, Ill., assignors to Amsted Industries Incorporated, Chicago, Ill.
Continuation-in-part of application Ser. No. 813,870, Apr. 7, 1969, now Patent No. 3,646,604. This application Nov. 11, 1971, Ser. No. 198,009
Int. Cl. F16c 23/04
U.S. Cl. 308—72
6 Claims

ABSTRACT OF THE DISCLOSURE

An articulated connection is provided having a bearing block with spherical protrusions which are seated in spherical pockets of a male member. The spherical protrusion—spherical pocket arrangement allows the bearing block to be rotated relative to the male member during angulation. The rotation is accomplished without the addition of unwanted slack.

---

This is a continuation-in-part of our U.S. Pat. No. 3,646,604 filed on Apr. 7, 1969. The disclosure relates generally to two-car railway truck arrangements and more particularly to improvements in the mounting of a pin bearing block in the pin hole of a coupling member.

The patents to Willison et al. 3,345,836, Kulieke 3,216,370, Livelsberger 3,396,673 and Weber 3,399,631 illustrate the general type of connection of the present invention, wherein the connection is provided between adjacent ends of railway cars and is supported upon the bolster of a single truck. In general, a male member is secured to one car and a female member is secured to the other car and and receives the male member in a telescoping arrangement. The respective members are held together around a longitudinal axis of relative pivotal movement by a vertical pin extending through the connection and into the underlying bolster center plate of the truck. The connections usually comprise internal spherical surfaces to provide for flexibility and normally include separate wear-absorbing parts that may be replaced after prolonged use of the connection. Such articulated connections are designed to negotiate vertical curves, as well as curves in a horizontal plane.

The use of internal parts in such connections in an abutting relationship and under high loads requires the maintenance of close tolerances to provent possible binding and galling within the connection. For example, excessive slack between the male and female members may allow displacement and wedging of certain parts against others. Since many of the parts used are cast steel structures, the maintenance of tolerances to insure a proper non-yielding fit is often a hardship.

Accordingly, an object of this invention is to provide an improved articulated connection with such features as to minimize excessive wear on internal parts, notwithstanding the close tolerances required.

FIG. 1 is a simplified side view of a two section railway car incorporating an articulated connection between the adjacent ends of said sections.

FIG. 2 is a vertical cross sectional view of an articulated connection.

FIG. 3 is a plan view, partly in cross section, of the structure shown in FIG. 2.

FIG. 4 is a plan view of the novel pin bearing block used in connection with the structure shown in FIGS. 2 and 3.

FIG. 5 is a vertical cross sectional view taken through the vertical center line of the male member of the articulated connection.

FIG. 6 is a fragmentary top plan view of the male member illustrated in FIG. 5, one half of which is taken on the horizontal center line of the male member.

FIG. 7 is a sectional view of the entire male member taken on line 7—7 of FIG. 6.

FIG. 8 is a sectional view of the entire male member taken on line 8—8 of FIG. 6.

FIG. 9 is a sectional view of the entire male member taken on line 9—9 of FIG. 6 and illustrating the engagement of the pin bearing block shown in FIG. 4 with the male member.

FIG. 1 schematically illustrates the two sections 10 and 12 of a railway car, the adjacent ends thereof being connected by an articulated connection 14. Connection 14 is supported on a common four-wheel truck 16, which may be of any known type, and four-wheel trucks 18 support the outer ends of sections 10 and 12.

The articulated connection allows for relative vertical rotational and lateral angular movement between car sections 10 and 12. The end of a male member 20 is secured to one of the car sections and a female member 22 having a funnel-shaped, open end cavity 23, is secured to the other car section along a common longitudinal axis X—X with said male member. As illustrated, axis X—X corresponds to the longitudinal center line of male member 20. Cavity 23 is substantially wider than male member 20 to allow articulation of the connection. An annular boss 24 is formed on the underside of female member 22 and is received upon the cup-shaped depression of a center plate 26 on a truck bolster 28.

A vertical bore 30 is provided through female member 22 for reception of a cylindrical pin 32, which defines the vertical axis Y—Y of relative pivotal movement between the members. An aperture 34 in the bottom of pin 32 loosely receives a second pin 36 of a smaller diameter, which is in turn received in an opening 38 in truck bolster center plate 26. It will be noted that the bottom of larger pin 32 rests on the top of center plate 26.

A handle 40 at the top of pin 32 comprises a horizontal member 42 in a horizontal opening 44 in a reduced diameter upper portion 45 of the pin and a U-shaped member 46, the free ends thereof being welded to the ends of the horizontal member. Horizontal member 42 is wider than the diameter of bore 30 in order to prevent accidental dislodgement of pin 32 in a downward direction when the articulated connection is separated from the underlying truck bolster 28. A retaining ring 48, in an anular recess 49 in bore 30, prevents creeping of the pin after assembly.

Male member 20 has an outer end spherical surface 50 and a vertical opening 52 therethrough defining a spherical inner end surface 54. Vertical opening 52 also accommodates pin 32 and a pin bearing block 56 having a semi-circular surface 58 surrounding a portion of pin 32 and an end spherical surface 60 abutting and complementary with the spherical inner surface 54 of male member 20.

It will be noted that extensions 55 of pin bearing block 56 define a semi-circular surface 58 that encircles about one-half of the circumference of the pin, and rounded or spherical protrusions 62 are provided on both outer side surfaces of the pin bearing block in the area of said extensions, said surfaces contacting an inner contoured side surface 64 of male member opening 52. Pin bearing block 56 is in contact with male member 20 in the area of protrusions 62 and end spherical surface 60, but is otherwise normally spaced therefrom. Protrusions 62 provide far greater lateral support within the connection during lateral shifting of the male and female members with respect to one another than is found in other similar connections. Pin bearing block 56 also comprises respective upper and lower planar surfaces 66 and 68 bearing respectively against an upper inner wall 70 and a lower annular hub 72 of female member 22.

The location and use of protrusions 62 are clearly illustrated in FIGS. 5 to 9 where an inner contoured side surface 64 is illustrated having a spherical pocket 102 which corresponds to the spherical protrusion 62 on bearing block 56. These pockets are struck from a point lying at the intersection of axis X—X, vertical axis Y—Y of pin 32, and lateral axis Z—Z. The radius $R_3$ of each pocket 102 is preferably slightly larger, e.g., 1/32 of an inch, than the radius $R_4$ used for each protrusion 62. Each pocket 102 opens into an enlarged portion 104 of opening 52 defined by a side wall 105 and a ledge 106. The lateral dimensions between the side walls of opposed portion 104 are such as to permit the introduction and removal of bearing block 56 into opening 52, i.e., greater than twice the radius of $R_4$. The ledges 106 should project outwardly away from the walls 106 in order to support the protrusions 62 and thereby retain bearing block 56 in opening 52. This may be accomplished by making the distance between the ledges, i.e., the portion on which the protrusion will be seated when bearing block 56 is moved forward toward wall 107, less than twice the radius $R_4$.

In assembling the arrangement, bearing block 56 is moved toward forward wall 107 of opening 52, moved downwardly, and then slid rearwardly until protrusions 62 seat in pockets 102 (FIG. 9). Such seating should occur at the same time surface 60 contacts surface 54. The sides 110 of bearing block 56 are preferably spaced from the side walls 112 of opening 52. If desired side walls 112 may be slightly angled outwardly e.g., five degrees to allow added clearance during movement of bearing block 56 relative to male member 20.

It should be appreciated that the spherical surfaces 54 and 60 are struck from the same point as radii $R_3$ and $R_4$. As illustrated radius $R_5$ of surface 54 is larger than radii $R_3$ and $R_4$. Since spherical surfaces 62, 102, 60 and 54 are concentric, in operation, bearing block 56 is free to rotate about point A a limited amount without permitting a slack condition to exist. The movement of bearing block 56 may be likened to a ball joint. This inter-relationship of bearing block 56 and male member 20 is believed to be a substantial departure from the prior art. It could be readily adapted on other railway car couplers, e.g., the American Association of Railroads standard type "F" coupler.

For the purpose of clearance, an annular recess 74 surrounds hub 72 coaxial with vertical axis Y—Y. Recess 74 defines a spherical concave annular surface 76 disposed outward and upward with respect to said axis. One or more drain holes 73 and 75 extend from the bottom of the recess downward and outward through the annular boss and exit above the top of truck bolster center plate 26. A ring 78 having an outer spherical convex annular surface 79 complementary with spherical concave annular surface 76 is carried in recess 74 and is suitably designed for universal tilting movement therein. A planar top surface 80 of ring 78 supports male member 20 on a similar continuous surface 82 thereof. Upper surface 84 of male member 20 is sloped downward toward spherical end 50 to provide clearance near the upper portion of male member 20.

End spherical surface 50 of male member 20 abuts a complementary spherical surface 86 of a follower block 88 positioned within cavity 23 of female member 22 and backed by a planar shim 90 against a flat end surface 91 of said cavity. In order to accurately position follower block 88 within cavity 23 and prevent undesirable movement thereof, sets of lugs are provided on the top, bottom and side interior walls of female member 22 at 92, 93 and 94 respectively, said lugs defining a space for reception of the follower block.

Additional means are employed to prevent possible interference of follower block 88 with ring 78 and its recess 74. As shown in FIG. 2, in vertical section, spherical end 50 of male member 20 and spherical convex surface 79 of ring 78 are centric about a common point A defined by the intersection of axes X—X, Y—Y, and Z—Z.

Spherical radius $R_1$ of spherical end 50 is greater than spherical radius $R_2$ of spherical convex surface 79 to provide additional clearance between the bottom of follower block 88 and ring 78, and a groove 95 is provided at the lower end of male member 20 to provide clearance when the end of said member is tilted downward with respect to the female member.

As shown in FIG. 2, shim 90 is supported by a horizontal ledge 96 extending into female member cavity 23 from the end thereof, said ledge preferably being of a greater thickness than said shim and accommodated by a recess 97 in follower block 88 to prevent interference therewith. Shim 90 is supported laterally by similar vertical ledges 98 extending from the end of female cavity 23, with suitable recesses 99 in follower block 88 to accommodate said ledges.

What is claimed is:

1. In a longitudinally extending member having an opening extending vertically therethrough partially defined by interior side surfaces and an interior end surface, and a bearing block extending between and abutting said interior surfaces, the improvement comprising extensions on each side of said bearing block extending in the direction of said interior side surfaces and exterior protrusions on each extension, each of said protrusions being engaged with an adjacent interior side surface.

2. The improvement according to claim 1 wherein said bearing block only engages said member at the interior side surfaces in the area of said protrusions and at the interior end surface.

3. The improvement according to claim 1 wherein each of said protrusions comprises a spherical segment defined by the surface generated by the outer point of a radius struck from a point in the area of the longitudinal center line of said bearing block, and each of said interior side surfaces have a spherical indentation defined by the surface generated by the outer point of a radius struck from said point, said indentations being mateably engaged with said protrusions.

4. The improvement according to claim 3 wherein said bearing block has a spherical segment between said protrusions, said segment being defined by the surface generated by the outer point of a radius struck from said point and said interior end surface has a spherical indentation defined by the surface generated by the outer point of a radius struck from said point, said spherical segment between said protrusions and said spherical indentation in said end surface being mateably engaged.

5. The improvement according to claim 3 wherein each of said spherical indentations in said interior side surfaces open into an enlarged portion defined by a side wall and an inwardly extending ledge, the distance between said opposed side walls of said enlarged portions being greater than twice the radius used to defined said protrusions and the distance between said opposed side walls of said enlarged portions less the inward extension of each of said ledges being less than twice the radius used to define said protrusions, whereby said protrusions will engage said ledges when said bearing block is moved forward away from said interior end surface and said protrusions will be spaced from said side walls in said forward position.

6. The improvement according to claim 1 wherein said extensions define between said protrusions a generally semicircular surface having a vertically extending axis.

References Cited

UNITED STATES PATENTS 3,354,836  11/1967  Willison et al. _____ 105—3

CHARLES P. MYHRE, Primary Examiner

F. SUSKO, Assistant Examiner